US010603970B2

(12) United States Patent
Auten et al.

(10) Patent No.: US 10,603,970 B2
(45) Date of Patent: Mar. 31, 2020

(54) BUSHING FOR VEHICLE SUSPENSION SYSTEM

(71) Applicant: ANAND NVH PRODUCTS, INC., Novi, MI (US)

(72) Inventors: Jeffrey D Auten, West Bloomfield, MI (US); Robert P Church, Canton, MI (US)

(73) Assignee: ANAND NVH PRODUCTS INC., Novi, MI (US)

( * ) Notice: Subject to any disclaimer, the term of this patent is extended or adjusted under 35 U.S.C. 154(b) by 0 days.

(21) Appl. No.: 15/018,344

(22) Filed: Feb. 8, 2016

(65) Prior Publication Data
US 2017/0166025 A1 Jun. 15, 2017

Related U.S. Application Data

(60) Provisional application No. 62/267,606, filed on Dec. 15, 2015.

(51) Int. Cl.
*B60G 11/12* (2006.01)
*F16F 1/38* (2006.01)

(52) U.S. Cl.
CPC ............... *B60G 11/12* (2013.01); *F16F 1/38* (2013.01); *F16F 1/3814* (2013.01);
(Continued)

(58) Field of Classification Search
CPC .......... F16F 1/38; F16F 1/3814; F16F 1/3863; B60G 11/12; B60G 2204/121; B60G 2204/41
(Continued)

(56) References Cited

U.S. PATENT DOCUMENTS 4,003,562 A   1/1977 Kaiser et al.
4,705,410 A * 11/1987 von Broock ........ F16F 13/1481
                                               267/140.12
(Continued)

FOREIGN PATENT DOCUMENTS

DE   102005058632   6/2007
DE   102008007092   8/2009
(Continued)

OTHER PUBLICATIONS

English Machine Translation of DE-102008007092 (Year: 2009).*
European Search Report; App. No. EP/16155638.6, dated Apr. 5, 2017.

*Primary Examiner* — Melody M Burch
(74) *Attorney, Agent, or Firm* — Dickinson Wright PLLC

(57) ABSTRACT

A bushing for use in a vehicle suspension system, the bushing including a cylindrical sleeve including an internal passageway extending from first to second ends of the sleeve, the sleeve dimensioned to receive a shackle bolt therethrough; an elastomeric member at least substantially surrounding and extending radially outwardly from an exterior circumferential surface of the sleeve, and the elastomeric member having a pair of spaced-apart, circumferential channels positioned between the first and second ends of the sleeve and opening outwardly away from a radially outermost exterior circumferential surface of the elastomeric member, the channels dividing the elastomeric member into three radially-extending portions, one of which radially-extending portions is intermediate the other radially-extending portions; a rigid retainer ring positioned over the intermediate one of the radially-extending portions, the retainer ring having spaced-apart sidewalls extending into the circumferential channels so as to capture only the intermediate one of the radially-extending portions therebetween; lubricant disposed between the retainer ring and the elastomeric
(Continued)

member; and a housing surrounding an exterior circumferential surface of the elastomeric member and the retainer ring, with the retainer ring positioned between the housing and the exterior circumferential surface of the elastomeric member. The bushing, including the housing, cylindrical sleeve, elastomeric member, retainer ring and lubricant, constitutes a single unit that is receivable in, and removable from, a vehicle suspension system.

25 Claims, 7 Drawing Sheets

(52) U.S. Cl.
CPC ...... *F16F 1/3863* (2013.01); *B60G 2204/121* (2013.01); *B60G 2204/41* (2013.01)

(58) Field of Classification Search
USPC .................................. 267/141, 141.1–141.6
See application file for complete search history.

(56) References Cited

U.S. PATENT DOCUMENTS

| | | | |
|---|---|---|---|
| 4,840,395 A | 6/1989 | Sturmon | |
| 4,966,472 A | 10/1990 | Link | |
| 5,439,203 A * | 8/1995 | Hadano | F16F 7/08 248/609 |
| 5,562,348 A | 10/1996 | Link | |
| 5,897,107 A | 4/1999 | Zierden et al. | |
| 5,988,614 A | 11/1999 | Sturmon | |
| 6,076,815 A | 6/2000 | Callman | |
| 6,619,639 B1 | 9/2003 | Shelley et al. | |
| 6,705,600 B2 * | 3/2004 | Yamaguchi | F16F 13/16 267/140.11 |
| 6,729,611 B2 * | 5/2004 | Deschaume | B60G 7/02 267/140.12 |
| 7,198,256 B2 * | 4/2007 | Tatura | F16F 1/387 267/140.12 |
| 7,540,478 B2 * | 6/2009 | de Fontenay | B60G 7/006 267/140.12 |
| 2004/0056397 A1* | 3/2004 | Tatura | F16F 1/387 267/140.12 |
| 2008/0277847 A1* | 11/2008 | Missig | F16C 27/063 267/141.3 |

FOREIGN PATENT DOCUMENTS

| | | |
|---|---|---|
| FR | 1204848 | 1/1960 |
| GB | 2317434 | 3/1998 |
| JP | 4349012 A * | 12/1992 |

* cited by examiner

BUSHING FOR VEHICLE SUSPENSION SYSTEM

CROSS-REFERENCE TO RELATED APPLICATIONS

This application is related to, and claims the benefit of priority from, U.S. Provisional Patent Application No. 62/267,606, filed 15 Dec. 2015, the disclosure of which is incorporated by reference herein in its entirety.

FIELD OF THE INVENTION

The present invention relates to elastomeric bushings for use in vehicle leaf-spring type vehicle suspension systems.

BACKGROUND

Elastomeric (e.g., rubber, urethane, etc.) bushings are employed in vehicle leaf-spring suspension systems in securing the leaf springs to the vehicle. Bushings dampen vibration transfer between the leaf springs and the vehicle, reduce transmitted road shock, etc.

With reference to FIG. 1, conventional bushings typically comprise two elastomeric cylinders 5a, 5b of generally identical construction, arranged in opposition in the eye of a leaf-spring 10 and secured to a shackle 15 with a shackle bolt 20. Each half of the bushing includes a terminal portion 6a, 6b in the form of a disk of greater diameter than the cylindrical portions. These terminal portions 6a, 6b are captured between the eye of the leaf-spring 10 and the shackle 15, as shown in FIG. 1, and serve to limit the side-to-side travel of the leaf-spring 10 relative to the longitudinal axis of the shackle bolt 20. Unfortunately, contact between the elastomeric material of the terminal portions 6a, 6b and the metal of the shackle 15 creates unwanted noise. To reduce the occurrence of such noise, grease (not depicted) may be applied to the surface of the terminal portions 6a, 6b. However, this grease tends to be washed away rather quickly in vehicle applications, where the bushings are exposed to the elements.

SUMMARY OF THE DISCLOSURE

Disclosed is a bushing for use in a vehicle leaf-spring suspension system, the bushing comprising, in combination: A cylindrical sleeve including an internal passageway extending from first to second ends of the sleeve, the sleeve dimensioned to receive a shackle bolt therethrough; an elastomeric member at least substantially surrounding and extending radially outwardly from an exterior circumferential surface of the sleeve, and the elastomeric member having a pair of spaced-apart, circumferential channels positioned between the first and second ends of the sleeve, the channels dividing the elastomeric member into three radially-extending portions, one of which radially-extending portions is intermediate the other radially-extending portions; a rigid retainer ring positioned over the intermediate one of the radially-extending portions, the retainer ring having spaced-apart sidewalls extending into the circumferential channels so as to capture the intermediate one of the radially-extending portions therebetween; lubricant disposed between the retainer ring and the elastomeric member; and a housing surrounding an exterior circumferential surface of the elastomeric member and the retainer ring.

Per one feature, the sleeve has an annular flange extending radially outwardly from the exterior circumferential surface of the sleeve, and the intermediate one of the radially-extending portions of the elastomeric member is disposed over the annular flange. Furthermore, the annular flange may be positioned at approximately a mid-point along the longitudinal axis of the sleeve.

According to a still further feature, the elastomeric member does not extend beyond the first and second ends of the sleeve.

Per still a further feature, the elastomeric member tapers to a minimum thickness proximate the first and second ends of the sleeve.

In one form, the elastomeric member may be made of rubber or polyurethane.

In one embodiment, the retainer ring is comprised of at least two mateable portions. In one form, the at least two mateable portions may comprise two semi-cylindrical halves.

According to one feature, wherein the lubricant is disposed in the circumferential channels of the elastomeric member.

Per one feature, the housing may be made of metal.

In one embodiment, the housing comprises: a pair of rings, each one of the pair of rings encircling one or the other of the two radially-extending portions of the elastomeric member which flank the intermediate one of the radially-extending portions; and, a cylindrical member extending in length between the pair of rings, the cylindrical member overlapping at least a portion of each of the pair of rings. Per one feature, each of the pair of rings includes a circumferential groove, and wherein further opposite ends of the cylindrical member are in contact with the circumferential grooves to fix the position of the cylindrical member relative to the pair of rings.

BRIEF DESCRIPTION OF THE DRAWINGS

An embodiment will now be described, by way of example only, with reference to the accompanying drawings, wherein.

WRITTEN DESCRIPTION

Figure 1:
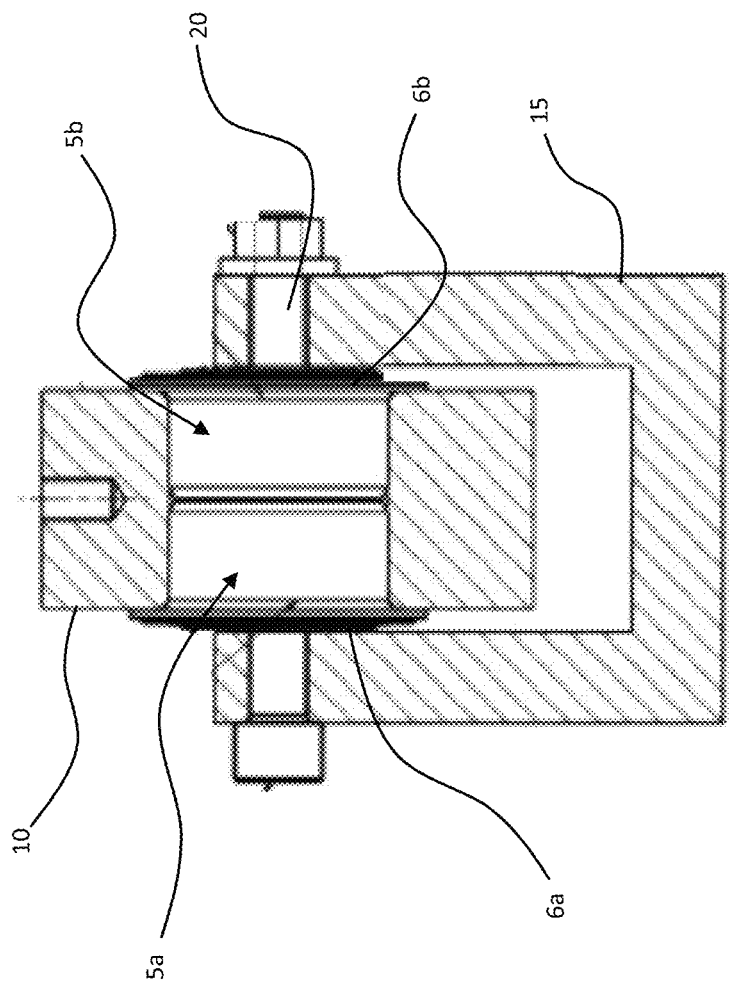
FIG. 1 is a cut-away view through a shackle and leaf-spring of a conventional elastomeric bushing.
Figure 2:
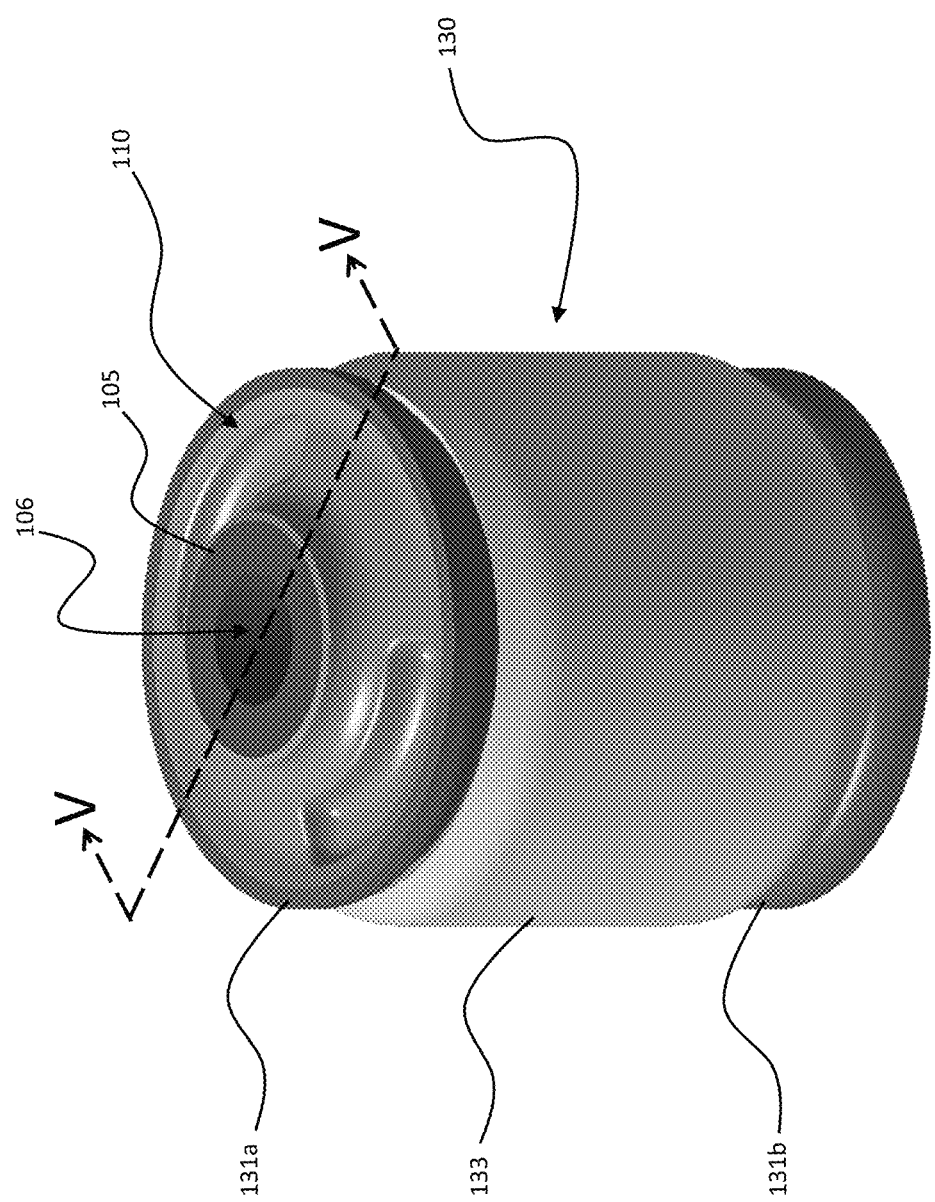
FIG. 2 is a perspective view of a bushing according to the exemplary embodiment of the present invention.

Referring now to the drawings, wherein like numerals indicate like or corresponding parts throughout the several views, there is disclosed a bushing for use in a vehicle leaf-spring suspension system.

More specifically, the bushing 100 comprises a cylindrical sleeve 105 including an internal passageway 106 extending from first 107a to second 107b ends of the sleeve, the sleeve dimensioned to receive a shackle bolt (200 in FIG. 7) therethrough. The sleeve 105 may be made of metal or other suitable material. According to the exemplary embodiment, the sleeve optionally has an annular flange 108 extending radially outwardly from the exterior circumferential surface of the sleeve. As depicted, the annular flange 108 is positioned at the mid-point along the longitudinal axis of the sleeve 105.

An elastomeric member (indicated generally at 110) at least substantially surrounds and extends radially outwardly from an exterior circumferential surface of the sleeve 105. The elastomeric member 110 may be made of rubber, polyurethane, or other material suited for employment in a bushing.

The elastomeric member 110 may, for instance, be molded in place on the sleeve 105, according to conventional methods.

Figure 3:
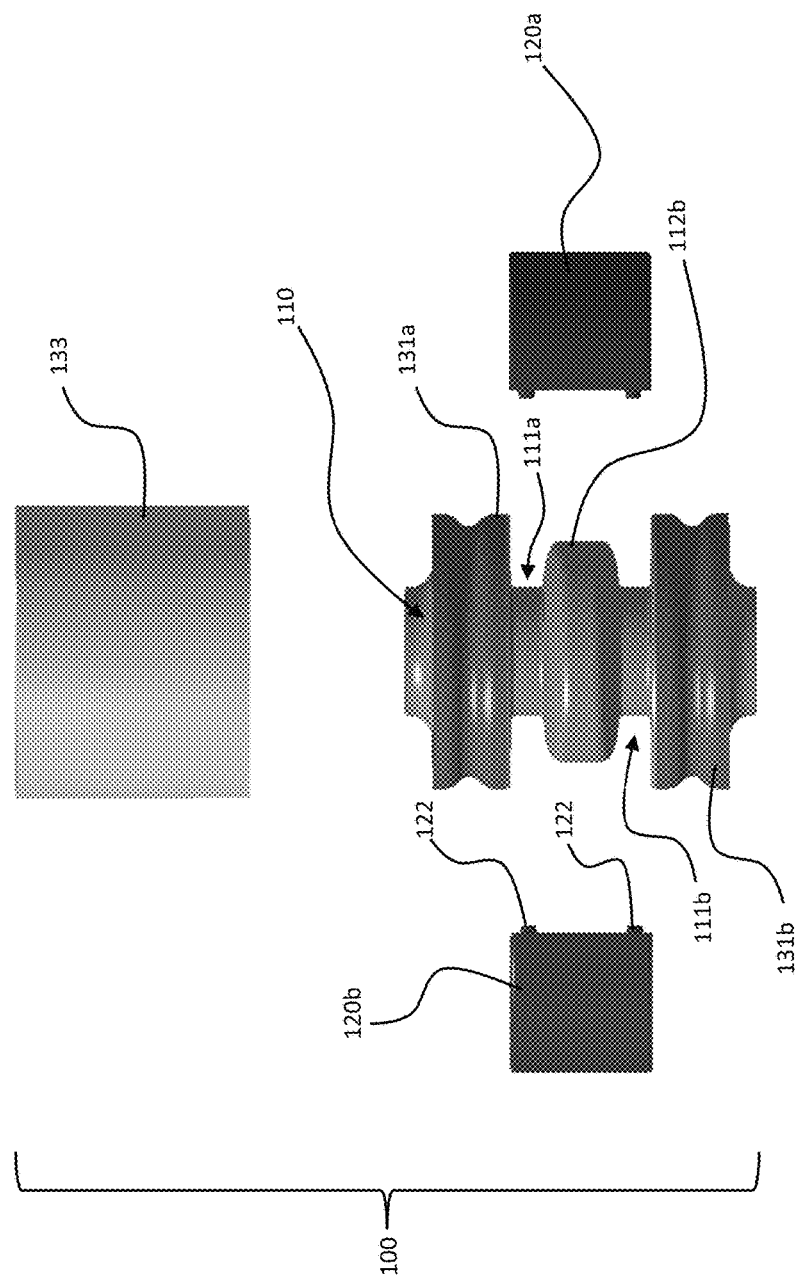
FIG. 3 is an elevation view of separate components of the bushing of FIG. 2.
Figure 4:
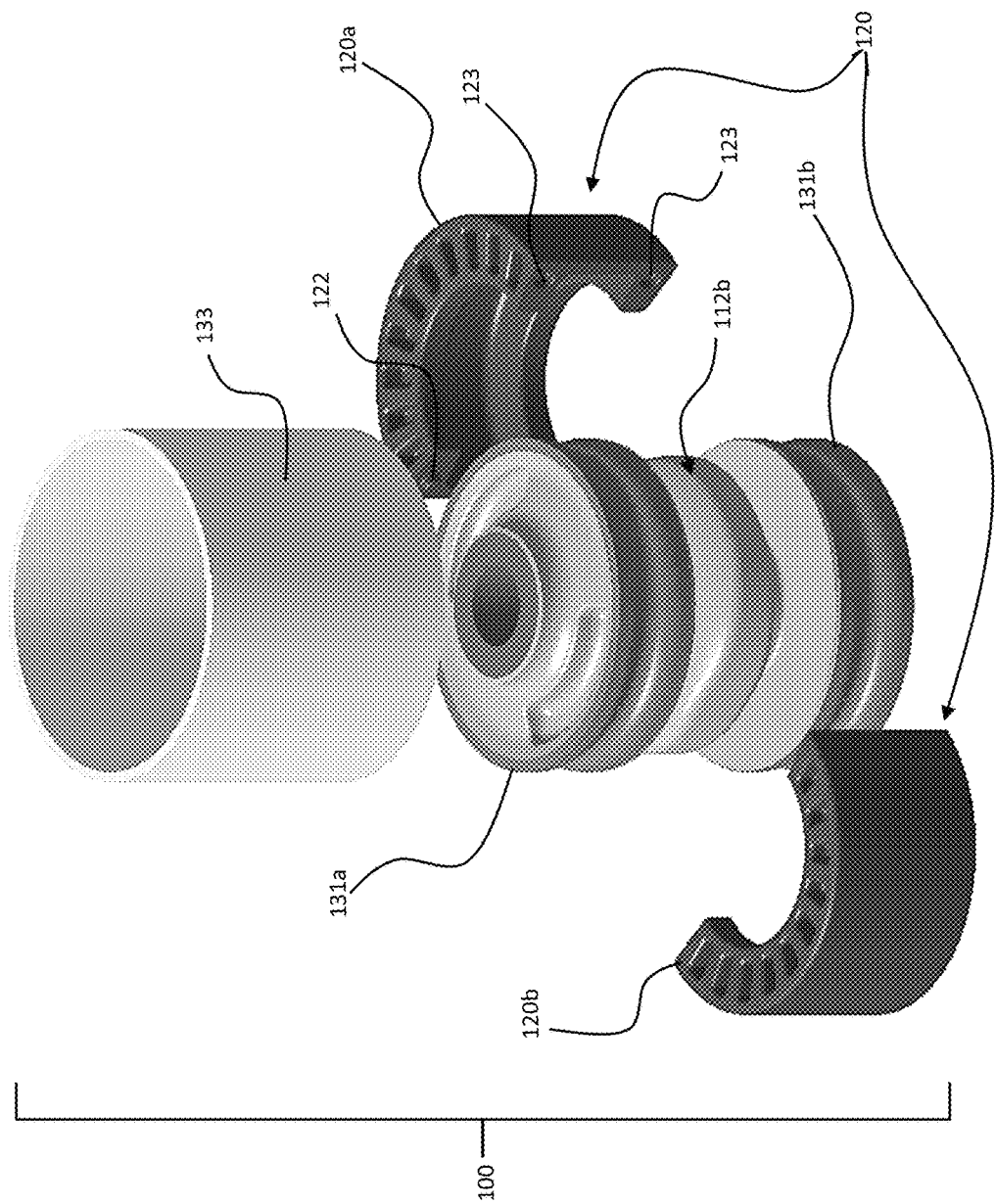
FIG. 4 is a perspective view of the bushing components of FIG. 3.
Figure 5:
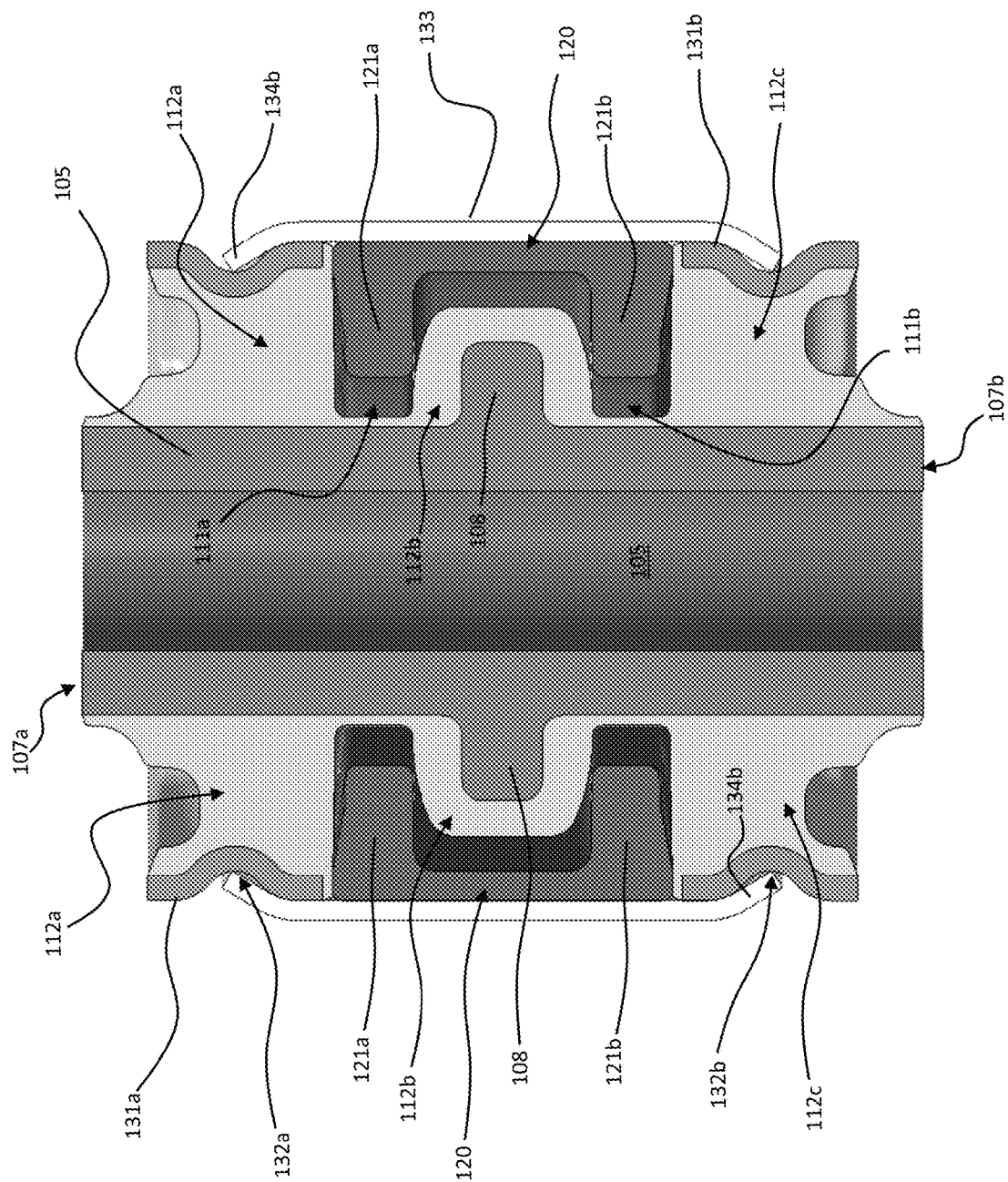
FIG. 5 is a cross-sectional view of the bushing of FIG. 2.
Figure 7:
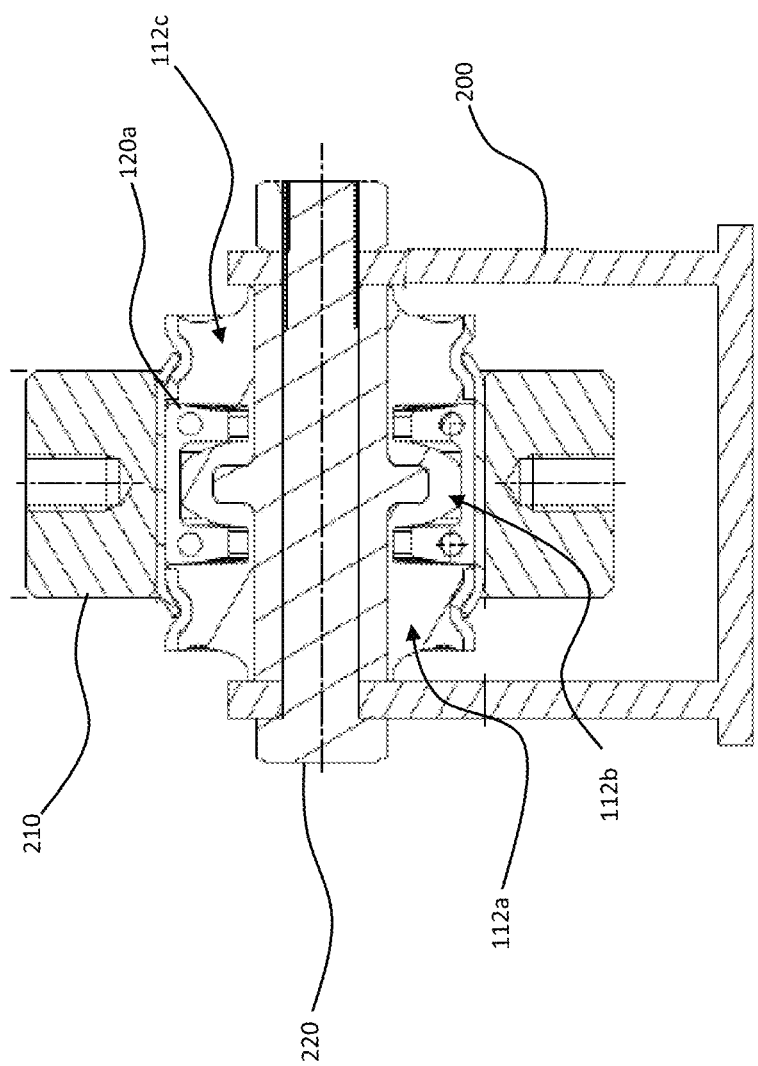
FIG. 7 is cross-sectional view of the bushing of FIGS. 2-5 shown in an operational environment secured to a shackle and leaf-spring.

As shown best in FIGS. 3, 5 and 7, the elastomeric member 110 tapers to a minimum thickness proximate the first 107a and second 107b ends of the sleeve. Per this construction, it will be appreciated that there is a minimum amount of elastomeric material at the region where the bushing comes in contact with the shackle (210 in FIG. 7) upon installation. In contrast to the construction of conventional bushings, the elastomeric member 110 does not extend beyond the ends 107a, 107b of the sleeve 105. Rather, side-to-side travel of the leaf spring is accommodated through the construction of the present invention as described further below.

Specifically, the elastomeric member 110 will be seen in each of FIGS. 3-7 to be characterized by a pair of spaced-apart, circumferential channels 111a, 111b positioned between the first 107a and second 107b ends of the sleeve. The channels 111a, 111b divide the elastomeric member into three radially-extending portions 112a, 112b, 112c, one of which radially-extending portions (112b) is intermediate the other radially-extending portions (112a, 112c). This intermediate one of the radially-extending portions 112b is of smaller radial dimensions than the others of the radially-extending portions 112a, 112c, as depicted best in FIGS. 5, 6 and 7.

Further, the intermediate one of the radially-extending portions (112b) of the elastomeric member is, in the exemplary embodiment, disposed over the annular flange 108 of the sleeve 105.

A rigid retainer ring 120 is positioned over the intermediate one (112b) of the radially-extending portions. The retainer ring 120, which may be made of plastic or other suitably rigid material, includes spaced-apart sidewalls 121a, 121b extending into the circumferential channels 111a, 111b of the elastomeric member 110 so as to capture the intermediate one of the radially-extending portions (112b) therebetween.

Per the illustrated embodiment, the retainer ring 120 is a two-piece element comprised of semi-cylindrical halves 120a, 120b which, in assembly of the bushing 100, are positioned on the elastomeric member 110 and then mated together. Pins 122 and corresponding bores 123 on opposing ends of the ring halves 120a, 120b ensure proper alignment and mating connection between the ring halves.

In assembly of the bushing, a suitable lubricant (not depicted), such as grease, is disposed between the retainer ring 120 and the elastomeric member 110. More particularly, such lubricant is placed in the channels 111a, 111b. By the bushing construction herein described, it will be appreciated that the lubricant is effectively trapped in the bushing and, consequently, is not apt to be washed away during use, as in the case of conventional bushings wherein grease is applied on exposed, external surfaces.

A housing (indicated generally at 130) surrounds an exterior circumferential surface of the elastomeric member 110 and the retainer ring 120. Housing 130 may be made of metal, for instance. In the illustrated embodiment, this housing 130 may be seen to be comprised of multiple components. More particularly, the housing 130 of the exemplary embodiment includes rings 131a, 131b encircling the radially-extending portions 112a, 112c of the elastomeric member 110. Each of these rings 131a, 131b includes an intermediate circumferential groove 132a, 132b. A larger cylindrical member 133 is dimensioned to be received over the elastomeric member 110 and extends in length between the rings 131a, 131b. In assembly, the opposite ends 134a, 134b of this cylindrical member are crimped or swaged inwardly into the grooves 132a, 132b of rings 131a, 131b, thereby fixing the position of the cylindrical member.

Figure 6:
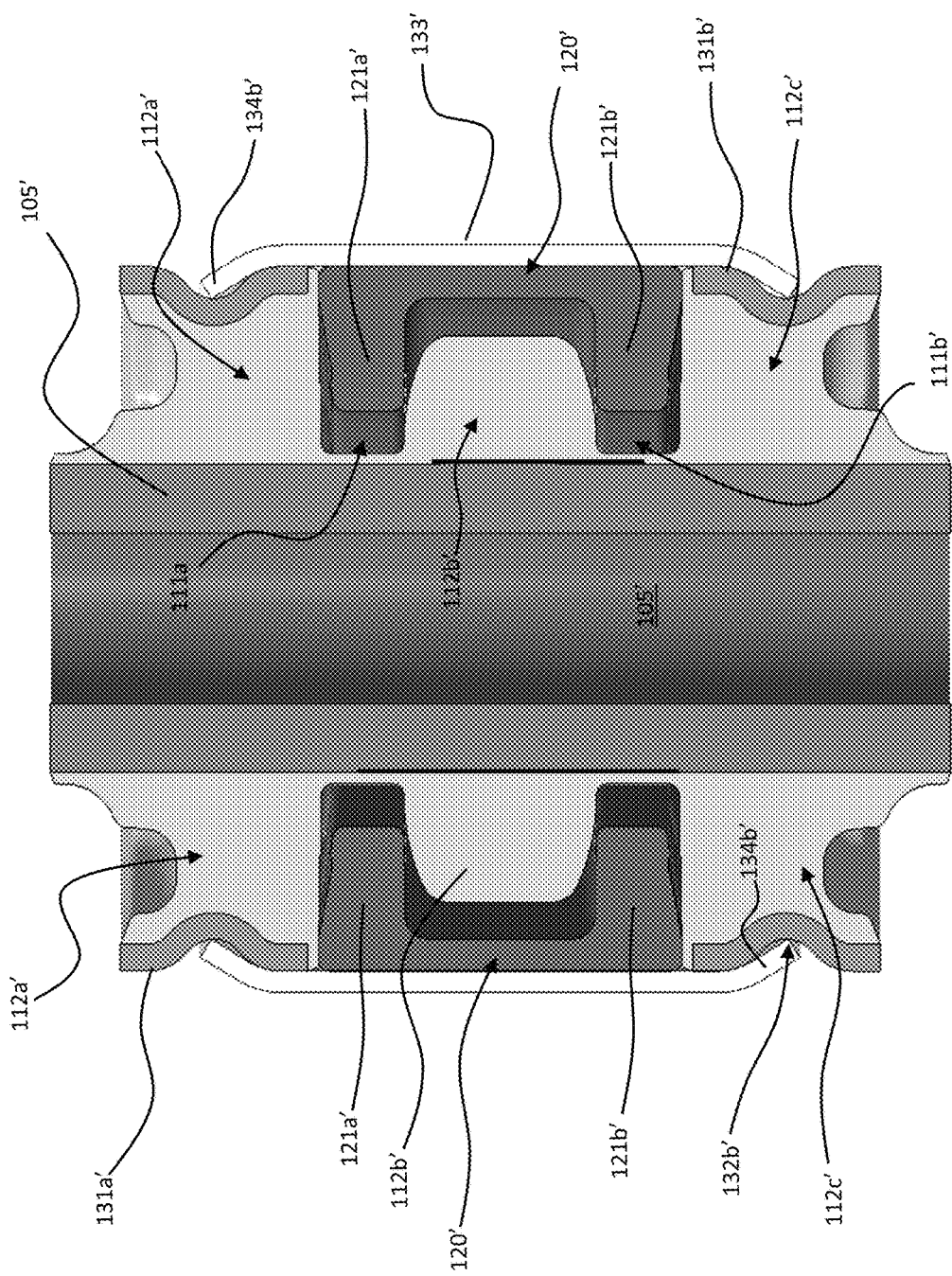
FIG. 6 is a cross-sectional view of a bushing of the present invention according to an alternative embodiment.

Referring now to FIG. 6, there is shown an embodiment of the present invention which is in all respects like that of FIGS. 2-5 except that the cylindrical sleeve 105' lacks the annular flange 108 described above. Instead, the intermediate one of the radially-extending portions 112b' may be seen to occupy the area occupied by the annular flange 108 in the earlier-described embodiment. As those skilled in the art will appreciate with the benefit of this disclosure, the absence of the annular flange 108 will alter the damping characteristics of the bushing in a manner which may be preferable to the bushing of the first embodiment disclosed herein.

With reference to FIG. 7 in particular, the bushing of the present invention is shown installed in a vehicle leaf-spring suspension system. More specifically, the bushing is positioned in the eye of a leaf-spring and then aligned with a shackle so that a shackle bolt may be received through the shackle and the sleeve to secure the bushing in place on the shackle. By the construction of the bushing herein described—and, more particularly, the configuration of the elastomeric member—the bushing is capable of accommodating side-to-side travel of the leaf-spring without having to provide, as in conventional bushings, elastomeric material between the shackle and leaf-spring. By provision, moreover, of the rigid retainer-ring as described, the extent of compression of the radially-extending portions of the elastomeric member is controlled. The lubricant disposed between the retainer ring and the elastomeric member likewise limits compression of the radially-extending portions of the elastomeric member. Still further, the lubricant reduces the noise associated with contact between the retainer ring and the elastomeric member.

By the invention as herein described, it will be appreciated that there is provided a leaf-spring bushing which accommodates side-to-side movement of the leaf spring while minimizing or altogether eliminating the noise associated with bushings of conventional construction.

Although an exemplary embodiment of the present invention has been described and illustrated, it will be apparent to those skilled in the art that numerous modifications and variations can be made thereto without departing from the scope of the invention as defined in the appended claims.

The invention in which an exclusive property or privilege is claimed is defined as follows:

1. A bushing for use in a vehicle suspension system, the bushing comprising, in combination:
   a cylindrical sleeve including an internal passageway extending along a longitudinal axis of the sleeve from first to second ends of the sleeve, the sleeve dimensioned to receive a shackle bolt therethrough;
   an elastomeric member at least substantially surrounding and extending radially outwardly from an exterior circumferential surface of the sleeve, and the elastomeric member having a pair of spaced-apart, circumferential channels positioned between the first and second ends of the sleeve, the channels opening outwardly away from a radially outermost exterior circumferential surface of the elastomeric member and dividing the elastomeric member into three radially-extending circumferential portions, one of which radially-extending circumferential portions is intermediate the other radially-extending portions and spaced apart therefrom by the circumferential channels;

a rigid retainer ring positioned over the intermediate one of the radially-extending portions, the retainer ring having spaced-apart sidewalls extending into the circumferential channels so as to capture only the intermediate one of the radially-extending portions therebetween;

lubricant disposed between the retainer ring and the elastomeric member; and a housing surrounding the exterior circumferential surface of the elastomeric member and the retainer ring, and wherein the rigid retainer ring is positioned between the housing and the exterior circumferential surface of the elastomeric member;

wherein the bushing, including the housing, cylindrical sleeve, elastomeric member, retainer ring and lubricant, constitutes a single unit that is receivable in, and removable from, a vehicle suspension system.

2. The bushing of claim 1, wherein the sleeve has an annular flange extending radially outwardly from the exterior circumferential surface of the sleeve, and wherein further the intermediate one of the radially-extending portions of the elastomeric member is disposed over the annular flange.

3. The bushing of claim 2, wherein the annular flange is positioned at approximately a mid-point along the longitudinal axis of the sleeve.

4. The bushing of claim 1, wherein the elastomeric member does not extend beyond the first and second ends of the sleeve.

5. The bushing of claim 4, wherein the elastomeric member tapers to a minimum thickness proximate the first and second ends of the sleeve.

6. The bushing of claim 1, wherein the elastomeric member is made of rubber or polyurethane.

7. The bushing of claim 1, wherein the retainer ring is comprised of at least two mateable portions.

8. The bushing of claim 7, wherein the at least two mateable portions comprise two semi-cylindrical halves.

9. The bushing of claim 1, wherein the lubricant is disposed in the circumferential channels of the elastomeric member.

10. The bushing of claim 1, wherein the housing is made of metal.

11. The bushing of claim 1, wherein the housing comprises: a pair of rings, each one of the pair of rings encircling one or the other of the two radially-extending portions of the elastomeric member which flank the intermediate one of the radially-extending portions; and a cylindrical member extending in length between the pair of rings, the cylindrical member overlapping at least a portion of each of the pair of rings.

12. The bushing of claim 11, wherein each of the pair of rings includes a circumferential groove, and wherein further opposite ends of the cylindrical member are in contact with the circumferential grooves to fix the position of the cylindrical member relative to the pair of rings.

13. A bushing for use in a vehicle suspension system, the bushing comprising, in combination:

a cylindrical sleeve including an internal passageway extending along a longitudinal axis of the sleeve from first to second ends of the sleeve, the sleeve dimensioned to receive a shackle bolt therethrough;

an elastomeric member at least substantially surrounding and extending radially outwardly from an exterior circumferential surface of the sleeve, and the elastomeric member having a pair of spaced-apart, circumferential channels positioned between the first and second ends of the sleeve, the channels dividing the elastomeric member into three radially-extending portions, one of which radially-extending portions is intermediate the other radially-extending portions and the circumferential channels;

a rigid retainer ring positioned over the intermediate one of the radially-extending portions, the retainer ring having spaced-apart sidewalls extending into the circumferential channels so as to capture the intermediate one of the radially-extending portions therebetween;

lubricant disposed between the retainer ring and the elastomeric member; and a housing surrounding an exterior circumferential surface of the elastomeric member and the retainer ring, the housing comprising a pair of rings, each one of the pair of rings encircling one or the other of the two radially-extending portions of the elastomeric member which flank the intermediate one of the radially-extending portions, and a cylindrical member extending in length between the pair of rings, the cylindrical member overlapping at least a portion of each of the pair of rings, and wherein each of the pair of rings includes a circumferential groove, and wherein further opposite ends of the cylindrical member are in contact with the circumferential grooves to fix the position of the cylindrical member relative to the pair of rings.

14. The bushing of claim 13, wherein the sleeve has an annular flange extending radially outwardly from the exterior circumferential surface of the sleeve, and wherein further the intermediate one of the radially-extending portions of the elastomeric member is disposed over the annular flange.

15. The bushing of claim 14, wherein the annular flange is positioned at approximately a mid-point along the longitudinal axis of the sleeve.

16. The bushing of claim 13, wherein the elastomeric member does not extend beyond the first and second ends of the sleeve.

17. The bushing of claim 16, wherein the elastomeric member tapers to a minimum thickness proximate the first and second ends of the sleeve.

18. The bushing of claim 13, wherein the elastomeric member is made of rubber or polyurethane.

19. The bushing of claim 13, wherein the retainer ring is comprised of at least two mateable portions.

20. The bushing of claim 19, wherein the at least two mateable portions comprise two semi-cylindrical halves.

21. A bushing for use in a vehicle suspension system, the bushing comprising, in combination:

a cylindrical sleeve including an internal passageway extending along a longitudinal axis of the sleeve from first to second ends of the sleeve, the sleeve dimensioned to receive a shackle bolt therethrough, and the sleeve having a flange extending radially outwardly from an exterior circumferential surface of the sleeve;

an elastomeric member at least substantially surrounding and extending radially outwardly from the sleeve, and the elastomeric member having a pair of spaced-apart, circumferential channels positioned between the first and second ends of the sleeve, the channels opening outwardly away from a radially outermost exterior circumferential surface of the elastomeric member to define therebetween a radially-extending intermediate portion, and wherein further the intermediate portion is disposed over the annular flange;

a rigid retainer ring positioned over the intermediate portion, the retainer ring having spaced-apart sidewalls extending only into the circumferential channels so that the intermediate portion is disposed between the sidewalls, and wherein further surfaces of the annular flange are disposed in opposition to surfaces of the retainer ring along at least a longitudinal axis of the bushing;

lubricant disposed between the retainer ring and the elastomeric member; and a housing surrounding the retainer ring and the exterior circumferential surface of the elastomeric member to constitute the bushing as an unitary structure with the retainer ring and the lubricant sealed therein;

wherein the bushing, including the housing, cylindrical sleeve, elastomeric member, retainer ring and lubricant, constitutes a single unit that is receivable in, and removable from, a vehicle suspension system.

22. The bushing of claim 21, wherein the elastomeric member does not extend beyond the first and second ends of the sleeve.

23. The bushing of claim 21, wherein the retainer ring is comprised of at least two mateable portions.

24. The bushing of claim 21, wherein the housing comprises: a pair of rings, each one of the pair of rings encircling one or the other of the two radially-extending portions of the elastomeric member which flank the intermediate one of the radially-extending portions; and a cylindrical member extending in length between the pair of rings, the cylindrical member overlapping at least a portion of each of the pair of rings.

25. The bushing of claim 24, wherein each of the pair of rings includes a circumferential groove, and wherein further opposite ends of the cylindrical member are in contact with the circumferential grooves to fix the position of the cylindrical member relative to the pair of rings.

* * * * *